(12) United States Patent
Taherzadeh Boroujeni et al.

(10) Patent No.: US 11,632,729 B2
(45) Date of Patent: Apr. 18, 2023

(54) GROUPING OF SYNCHRONIZATION SIGNAL BLOCK SUBSETS FROM DIFFERENT BASE STATIONS IN A SINGLE TIMING ADVANCE GROUP

(71) Applicant: QUALCOMM Incorporated, San Diego, CA (US)

(72) Inventors: Mahmoud Taherzadeh Boroujeni, San Diego, CA (US); Tao Luo, San Diego, CA (US); Jelena Damnjanovic, Del Mar, CA (US); Junyi Li, Franklin Park, NJ (US); Peter Gaal, San Diego, CA (US); Yan Zhou, San Diego, CA (US); Sony Akkarakaran, Poway, CA (US)

(73) Assignee: QUALCOMM Incorporated, San Diego, CA (US)

( * ) Notice: Subject to any disclaimer, the term of this patent is extended or adjusted under 35 U.S.C. 154(b) by 16 days.

(21) Appl. No.: 17/199,125

(22) Filed: Mar. 11, 2021

(65) Prior Publication Data
US 2022/0295424 A1    Sep. 15, 2022

(51) Int. Cl.
*H04W 56/00* (2009.01)
*H04W 72/0446* (2023.01)
*H04J 11/00* (2006.01)
*H04W 72/1273* (2023.01)
*H04W 74/00* (2009.01)

(52) U.S. Cl.
CPC ....... *H04W 56/001* (2013.01); *H04J 11/0079* (2013.01); *H04W 72/0446* (2013.01); *H04W 72/1273* (2013.01); *H04W 74/006* (2013.01)

(58) Field of Classification Search
CPC ....... H04L 12/43; H04J 3/0658; H04J 3/0635; H04J 11/0079; H04W 56/001; H04W 74/006; H04W 72/1273
See application file for complete search history.

(56) References Cited

U.S. PATENT DOCUMENTS

| | | | |
|---|---|---|---|
| 2013/0114505 A1* | 5/2013 | Haim | H04W 52/34 370/328 |
| 2018/0262313 A1* | 9/2018 | Nam | H04L 5/0044 |
| 2019/0191399 A1* | 6/2019 | Islam | H04W 56/009 |
| 2020/0196216 A1* | 6/2020 | Hui | H04W 36/305 |
| 2020/0351729 A1* | 11/2020 | Rastegardoost | H04W 36/0072 |
| 2021/0204178 A1* | 7/2021 | Jung | H04W 36/0077 |
| 2021/0235397 A1* | 7/2021 | Zhang | H04W 72/046 |
| 2021/0289461 A1* | 9/2021 | Zhang | H04W 56/0005 |

\* cited by examiner

*Primary Examiner* — Salvador E Rivas
(74) *Attorney, Agent, or Firm* — Harrity & Harrity, LLP

(57) ABSTRACT

Various aspects of the present disclosure generally relate to wireless communication. In some aspects, a user equipment (UE) may receive, from a first base station, a synchronization signal block (SSB) based at least in part on a determination that the SSB is included in a timing advance group (TAG) that includes a first subset of SSBs of a first set of SSBs associated with the first base station and a second subset of SSBs of a second set of SSBs associated with a second base station. The UE may communicate with the first base station based at least in part on the SSB. Numerous other aspects are described.

29 Claims, 9 Drawing Sheets

GROUPING OF SYNCHRONIZATION SIGNAL BLOCK SUBSETS FROM DIFFERENT BASE STATIONS IN A SINGLE TIMING ADVANCE GROUP

FIELD OF THE DISCLOSURE

Aspects of the present disclosure generally relate to wireless communication and to techniques and apparatuses for grouping of synchronization signal block subsets from different base stations in a single timing advance group.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication performed by a user equipment (UE) includes receiving, from a first base station, a synchronization signal block (SSB) based at least in part on a determination that the SSB is included in a timing advance group (TAG) that includes a first subset of SSBs of a first set of SSBs associated with the first base station and a second subset of SSBs of a second set of SSBs associated with a second base station; and communicating with the first base station based at least in part on the SSB.

In some aspects, a method of wireless communication performed by a first base station includes transmitting, to a UE, a SSB based at least in part on a determination that the SSB is included in a TAG that includes a first subset of SSBs of a first set of SSBs associated with the first base station and a second subset of SSBs of a second set of SSBs associated with a second base station; and communicating with the UE based at least in part on the SSB.

In some aspects, a method of wireless communication performed by a first base station includes transmitting, to a UE, a TAG configuration that indicates that a TAG includes a first subset of SSBs of a first set of SSBs associated with the first base station and a second subset of SSBs of a second set of SSBs associated with a second base station; and transmitting, to the UE, an indication of a TA threshold, wherein the TAG includes the second set of SSBs based at least in part on a determination that a TA from the first base station satisfies the TA threshold.

In some aspects, a UE for wireless communication includes a memory; and one or more processors, coupled to the memory, configured to: receive, from a first base station, a SSB based at least in part on a determination that the SSB is included in a TAG that includes a first subset of SSBs of a first set of SSBs associated with the first base station and a second subset of SSBs of a second set of SSBs associated with a second base station; and communicate with the first base station based at least in part on the SSB.

In some aspects, a first base station for wireless communication includes a memory; and one or more processors, coupled to the memory, configured to: transmit, to a UE, a SSB based at least in part on a determination that the SSB is included in a TAG that includes a first subset of SSBs of a first set of SSBs associated with the first base station and a second subset of SSBs of a second set of SSBs associated with a second base station; and communicate with the UE based at least in part on the SSB.

In some aspects, a first base station for wireless communication includes a memory; and one or more processors, coupled to the memory, configured to: transmit, to a UE, a TAG configuration that indicates that a TAG includes a first subset of SSBs of a first set of SSBs associated with the first base station and a second subset of SSBs of a second set of SSBs associated with a second base station; and transmit, to the UE, an indication of a TA threshold, wherein the TAG includes the second set of SSBs based at least in part on a determination that a TA from the first base station satisfies the TA threshold.

In some aspects, a non-transitory computer-readable medium storing a set of instructions for wireless communication includes one or more instructions that, when executed by one or more processors of a UE, cause the UE to: receive, from a first base station, a SSB based at least in part on a determination that the SSB is included in a TAG that includes a first subset of SSBs of a first set of SSBs associated with the first base station and a second subset of SSBs of a second set of SSBs associated with a second base station; and communicate with the first base station based at least in part on the SSB.

In some aspects, a non-transitory computer-readable medium storing a set of instructions for wireless communication includes one or more instructions that, when executed by one or more processors of a first base station, cause the first base station to: transmit, to a UE, a SSB based at least in part on a determination that the SSB is included in a TAG that includes a first subset of SSBs of a first set of SSBs associated with the first base station and a second subset of SSBs of a second set of SSBs associated with a second base station; and communicate with the UE based at least in part on the SSB.

In some aspects, a non-transitory computer-readable medium storing a set of instructions for wireless communication includes one or more instructions that, when executed by one or more processors of a first base station, cause the first base station to: transmit, to a UE, a TAG configuration that indicates that a TAG includes a first subset of SSBs of a first set of SSBs associated with the first base station and a second subset of SSBs of a second set of SSBs associated with a second base station; and transmit, to the UE, an indication of a TA threshold, wherein the TAG includes the second set of SSBs based at least in part on a determination that a TA from the first base station satisfies the TA threshold.

In some aspects, an apparatus for wireless communication includes means for receiving, from a first base station, a SSB based at least in part on a determination that the SSB is included in a TAG that includes a first subset of SSBs of a first set of SSBs associated with the first base station and a second subset of SSBs of a second set of SSBs associated with a second base station; and means for communicating with the first base station based at least in part on the SSB.

In some aspects, an apparatus for wireless communication includes means for transmitting, to a UE, a SSB based at least in part on a determination that the SSB is included in a TAG that includes a first subset of SSBs of a first set of SSBs associated with the first base station and a second subset of SSBs of a second set of SSBs associated with a second base station; and means for communicating with the UE based at least in part on the SSB.

In some aspects, an apparatus for wireless communication includes means for transmitting, to a UE, a TAG configuration that indicates that a TAG includes a first subset of SSBs of a first set of SSBs associated with the apparatus and a second subset of SSBs of a second set of SSBs associated with a base station; and means for transmitting, to the UE, an indication of a TA threshold, wherein the TAG includes the second set of SSBs based at least in part on a determination that a TA from the apparatus satisfies the TA threshold.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, or artificial intelligence-enabled devices). Aspects may be implemented in chip-level components, modular components, non-modular components, non-chip-level components, device-level components, or system-level components. Devices incorporating described aspects and features may include additional components and features for implementation and practice of claimed and described aspects. For example, transmission and reception of wireless signals may include a number of components for analog and digital purposes (e.g., hardware components including antenna, RF chains, power amplifiers, modulators, buffer, processor(s), interleaver, adders, or summers). It is intended that aspects described herein may be practiced in a wide variety of devices, components, systems, distributed arrangements, or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings.

This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
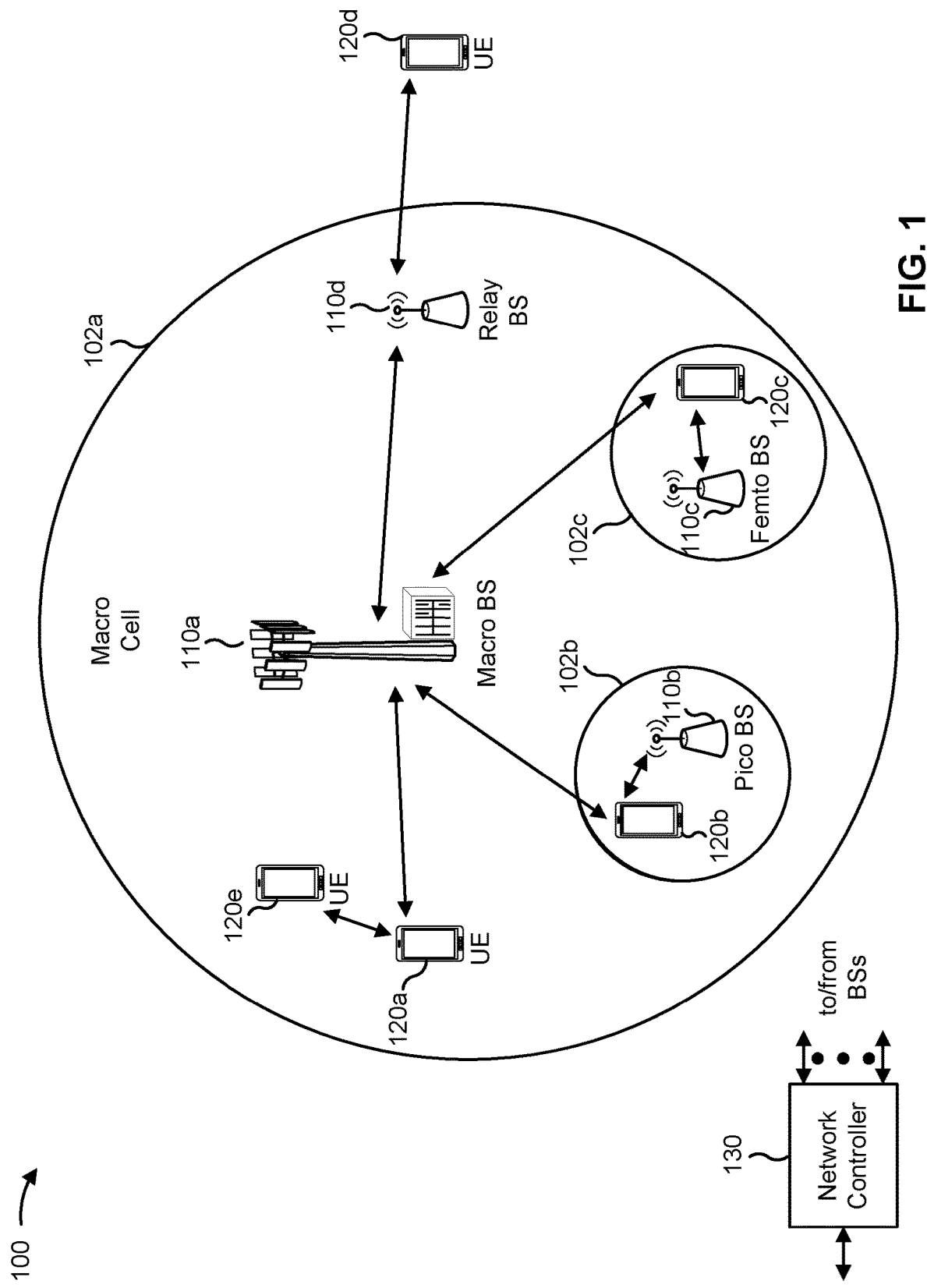
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (NR) network and/or an LTE network, among other examples. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
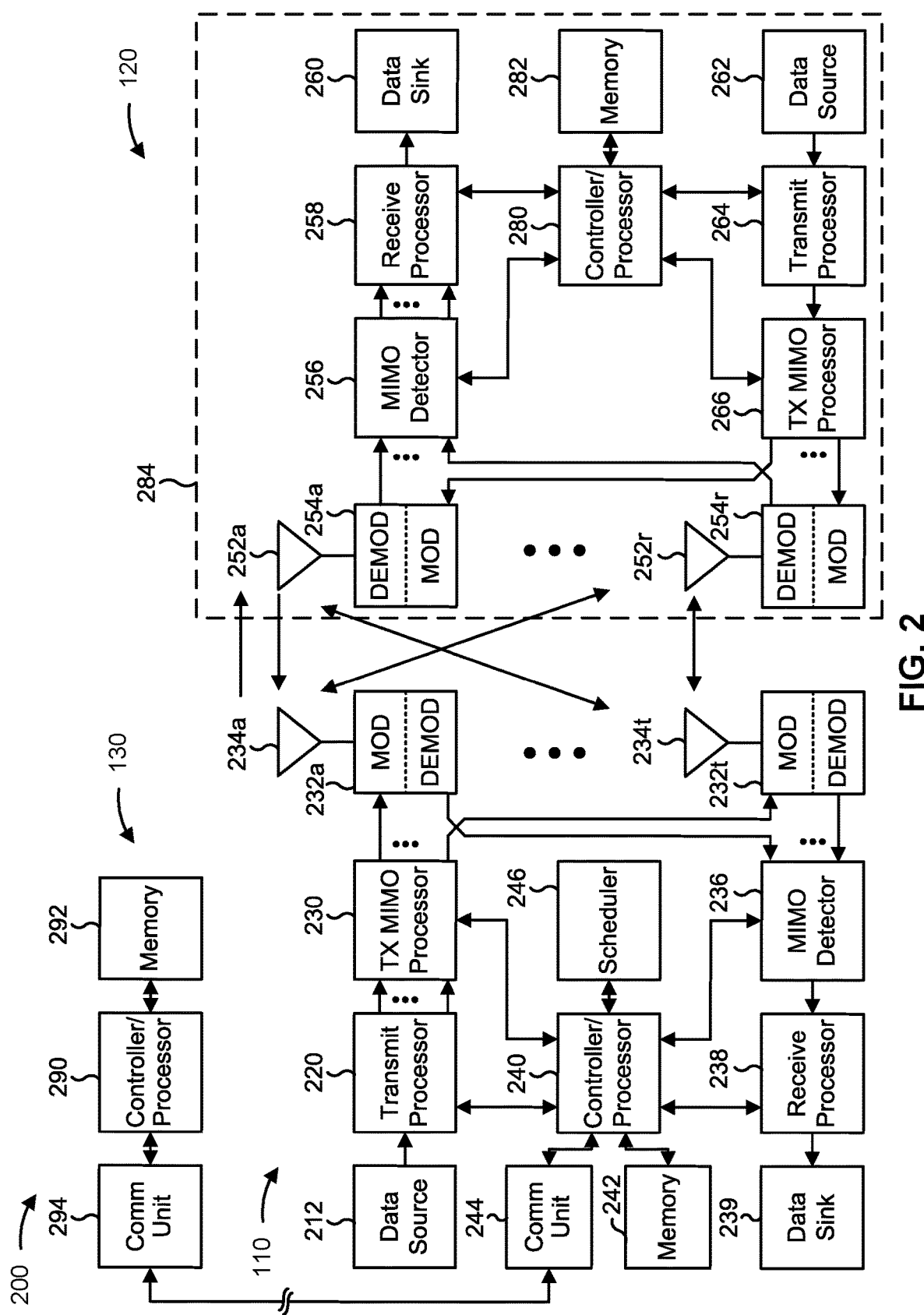
FIG. 2 is a diagram illustrating an example of a base station in communication with a UE in a wireless network, in accordance with the present disclosure.

FIG. 2 is a diagram illustrating an example 200 of a base station 110 in communication with a UE 120 in a wireless network 100, in accordance with the present disclosure. Base station 110 may be equipped with T antennas 234a through 234t, and UE 120 may be equipped with R antennas 252a through 252r, where in general $T \geq 1$ and $R \geq 1$.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM or CP-OFDM) and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein, for example, as described with reference to FIGS. 4-7.

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein, for example, as described with reference to FIGS. 4-7.

Controller/processor 240 of base station 110, controller/processor 280 of UE 120, and/or any other component(s) of FIG. 2 may perform one or more techniques associated with grouping of synchronization signal block (SSB) subsets from different base stations in a single timing advance group (TAG), as described in more detail elsewhere herein. For example, controller/processor 240 of base station 110, controller/processor 280 of UE 120, and/or any other component(s) of FIG. 2 may perform or direct operations of, for example, process 500 of FIG. 5, process 600 of FIG. 6, process 700 of FIG. 7, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 500 of FIG. 5, process 600 of FIG. 6, process 700 of FIG. 7, and/or other processes as described herein. In some aspects, executing instructions may include running the instructions, converting the instructions, compiling the instructions, and/or interpreting the instructions, among other examples.

In some aspects, the UE includes means for receiving, from a first base station, an SSB based at least in part on a determination that the SSB is included in a TAG that includes a first subset of SSBs of a first set of SSBs associated with the first base station and a second subset of SSBs of a second set of SSBs associated with a second base station; or means for communicating with the first base station based at least in part on the SSB. The means for the UE to perform operations described herein may include, for example, one or more of antenna 252, demodulator 254, MIMO detector 256, receive processor 258, transmit processor 264, TX MIMO processor 266, modulator 254, controller/processor 280, or memory 282.

In some aspects, the UE includes means for receiving an indication of the TA threshold. In some aspects, the UE includes means for receiving, from the second base station, a TAG configuration that indicates a conditional relationship between the first subset of SSBs and the TAG.

In some aspects, the first base station includes means for transmitting, to a UE, an SSB based at least in part on a determination that the SSB is included in a TAG that includes a first subset of SSBs of a first set of SSBs associated with the first base station and a second subset of SSBs of a second set of SSBs associated with a second base station; or means for communicating with the UE based at least in part on the SSB. The means for the first base station to perform operations described herein may include, for example, one or more of transmit processor 220, TX MIMO processor 230, modulator 232, antenna 234, demodulator 232, MIMO detector 236, receive processor 238, controller/processor 240, memory 242, or scheduler 246.

In some aspects, the first base station includes means for transmitting, to a UE, a TAG configuration that indicates that a TAG includes a first subset of SSBs of a first set of SSBs associated with the first base station and a second subset of SSBs of a second set of SSBs associated with a second base station; or means for transmitting, to the UE, an indication of a TA threshold, wherein the TAG includes the second set of SSBs based at least in part on a determination that a TA from the first base station satisfies the TA threshold. The means for the first base station to perform operations described herein may include, for example, one or more of transmit processor 220, TX MIMO processor 230, modulator 232, antenna 234, demodulator 232, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

Figure 3:
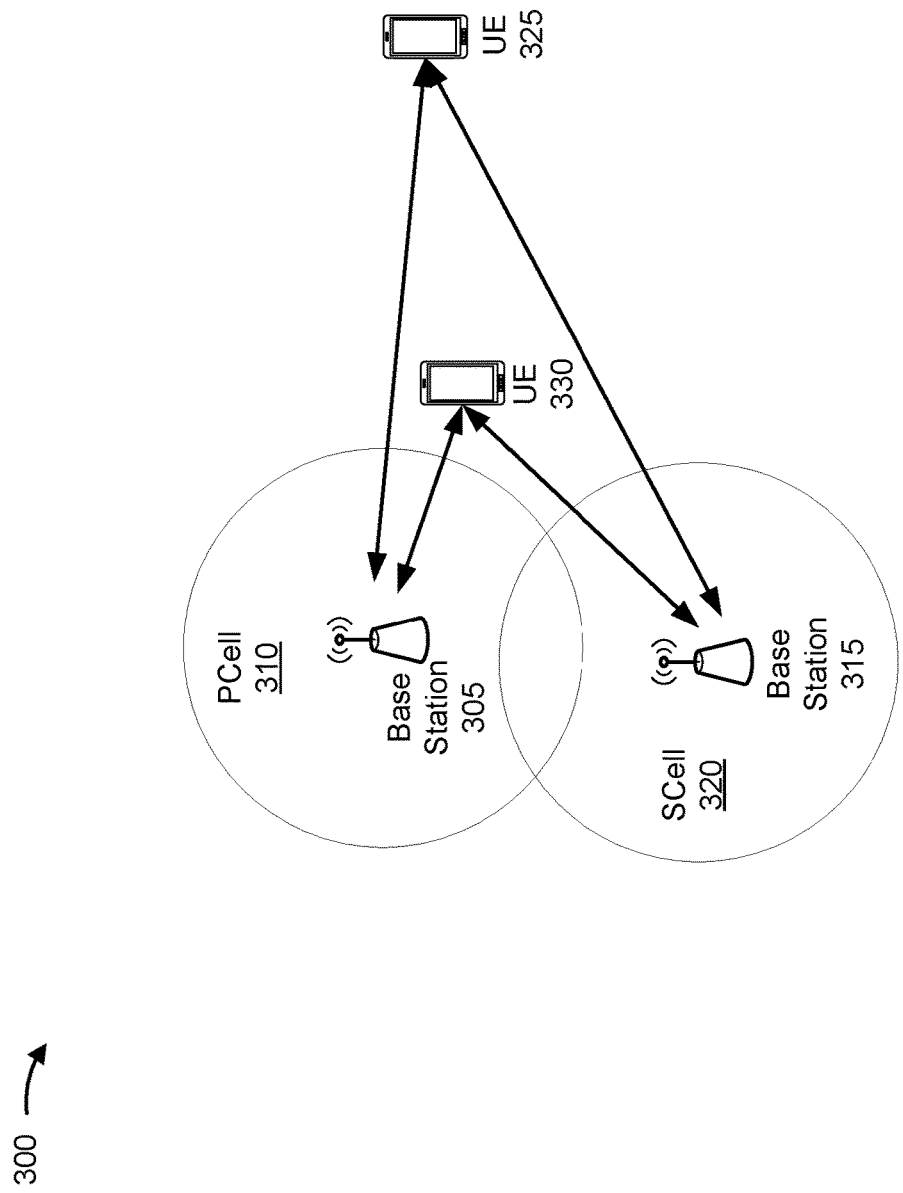
FIG. 3 is a diagram illustrating an example of mobility in communications, in accordance with the present disclosure.

FIG. 3 is a diagram illustrating an example 300 of intercell mobility in communications, in accordance with the present disclosure. As shown, a base station 305 may provide a primary cell (shown as "PCell") 310, and a base station 315 may provide a secondary cell (shown as "SCell") 320. A UE 325 and a UE 330 may communicate with the base stations 305 and 315.

In some scenarios, such as dual connectivity and/or carrier aggregation, different cells or uplink carriers may be configured in different TAGs. For example, a first uplink carrier and a second uplink carrier may have different propagation delays between the UE 325 and/or 330 and corresponding base stations 305 and 315, which may not be co-located. For example, a first serving cell (e.g., PCell 310) for the first uplink carrier may be provided by a first base station 305 (e.g., a first TRP, a first antenna array of a base station 110, and/or the like), and a second serving cell (e.g., SCell 320) for the second uplink carrier may be provided by a second base station 315 (e.g., a second TRP, a second antenna array of a base station 110, and/or the like) that is not co-located with the first base station 305, resulting in different propagation delays for uplink transmissions to reach a respective base station 305 or 315 on the different uplink carriers. As a result, the first uplink carrier and the second uplink carrier may have different timing advance values for uplink transmissions and may belong to different TAGs.

A TAG may refer to a set of uplink carriers that have the same (or similar within a threshold value) timing advance (TA) values. A UE 325 and/or 330 may use a timing advance value for an uplink carrier to transmit an uplink communication on the uplink carrier with a timing that results in synchronization of transmission time intervals (TTIs) with a base station 305 or 315, to reduce inter-TTI interference.

In some cases, a UE (e.g., the UE 325 or 330) may be configured for intra-cell mobility and/or inter-cell mobility. In intra-cell mobility, a cell, e.g., the PCell 310, can have multiple remote radio headers (RRH)s that share an SSB identifier (ID) space. Each RRH may be, for example, a base station and may transmit SSBs having one or more SSB IDs of a subset of SSBs IDs, while all of the SSBs may include a single physical cell indicator (PCI) corresponding to the serving cell. A particular RRH may use downlink control information (DCI) and/or medium access control (MAC) control elements (MAC CEs) to facilitate selecting which SSB (and, thus, which RRH) is used to serve the UE 325.

When the UE 325 switches among RRHs within a same serving cell, propagation delays associated with different RRHs can be different. However, each RRH may belong to a single TAG, which has a single TA offset value. Thus, when the UE 325 switches from a first RRH to a second RRH, one of the RRHs (or another base station) may have to trigger a physical downlink control channel (PDCCH) order for an uplink (UL) TA measurement and send the updated TA offset to the UE 325. This may increase RRH switching latency and overhead. To reduce the RRH switching latency and overhead, each SSB or subset of SSBs of a serving cell may be associated with one TAG.

Example 300 illustrates an inter-cell mobility scenario, in which a UE 325 may be dually connected with the PCell 310 and the SCell 320 and/or may switch from connection to PCell 310 to connection with SCell 320. In this case, when the UE 325 or 330 switches from the PCell 310 to the SCell 320, the PCell may trigger a PDCCH order for an UL TA measurement associated with the SCell and send the updated TA offset to the UE 325 or 330. Similar to the intra-cell mobility case described above, this may increase switching latency and overhead. However, in some cases, the PCell and the SCell may be adjacent one another and/or otherwise be located in such a way that respective corresponding TA values are similar.

Moreover, a combination of an SSB beam (which indicates a direction from the UE towards the PCell base station) and TA from the PCell (which indicates the distance of the UE from the PCell base station) may be a good proxy for the location of UE TA differentials among the base stations. For example, the difference between the TA corresponding to the base station 305 and the TA corresponding to the base station 315 for the UE 330 may be much smaller than for the UE 330. In this case, the increased switching latency and overhead introduced by a PDCCH order for UE TA measurement may be unnecessary.

Some aspects of the subject matter disclosed herein may provide for grouping of SSB subsets from different base stations in single a TAG. For example, in some aspects, a first base station (e.g., associated with an SCell) may transmit an SSB to a UE based at least in part on a determination that the SSB is included in a TAG that includes a first subset of SSBs of a first set of SSBs associated with the first base station and a second subset of SSBs of a second set of SSBs associated with a second base station (e.g., associated with a PCell). The UE may communicate with the first base station based at least in part on the SSB. In this way, aspects may facilitate grouping SSBs of different base stations within a TAG, thus eliminating a need for an UL TA measurement in anticipation of a switch between the base stations. As a result, some aspects may decrease switching latency and overhead during intra-cell and/or inter-cell switching, which may have a positive impact on network performance.

As indicated above, FIG. 3 is provided as an example. Other examples may differ from what is described with regard to FIG. 3.

Figure 4:
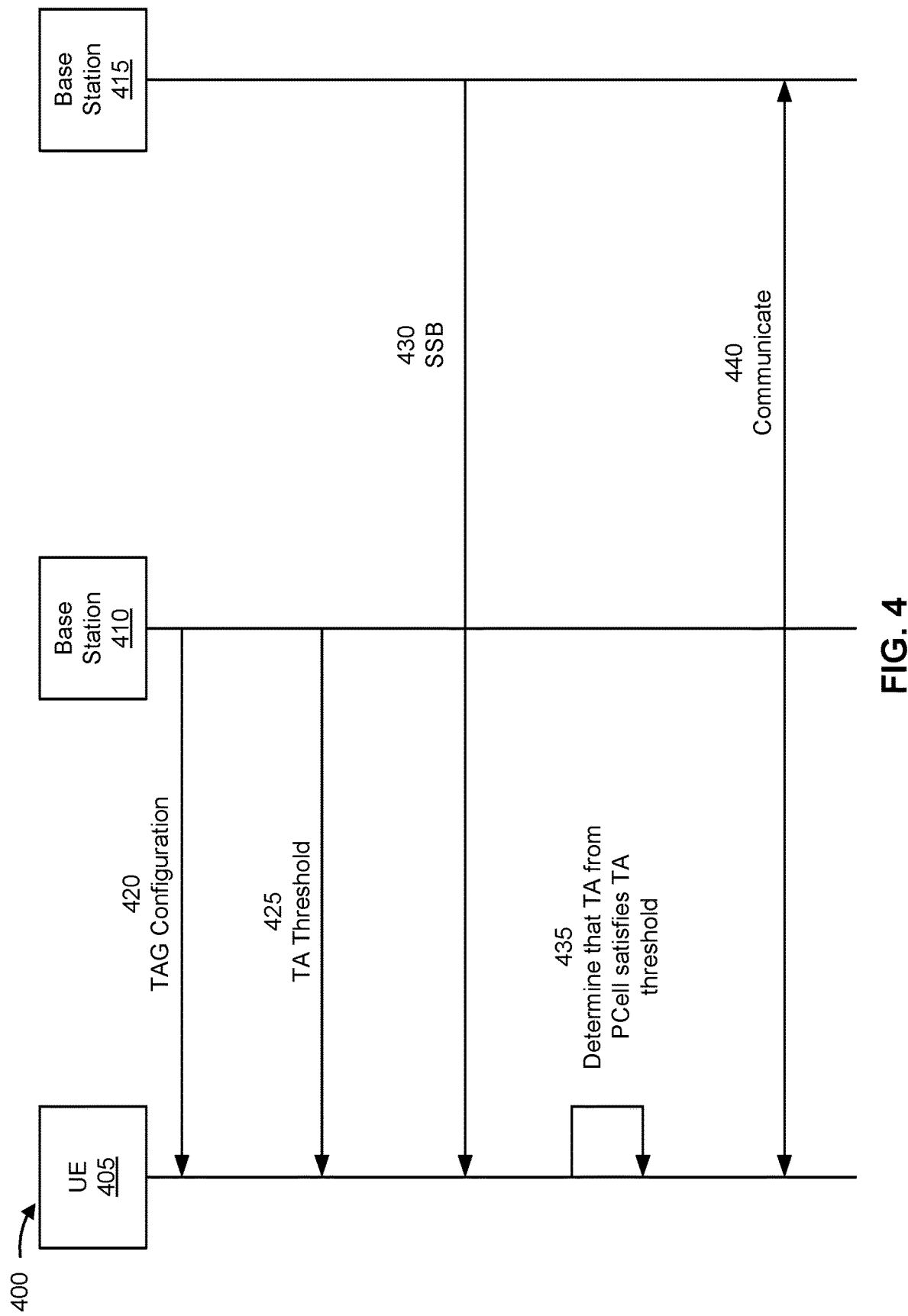
FIG. 4 is a diagram illustrating an example associated with grouping of synchronization signal block (SSB) subsets from different base stations in a single timing advance group (TAG), in accordance with the present disclosure.

FIG. 4 is a diagram illustrating an example 400 associated with grouping of SSB subsets from different base stations in a single TAG, in accordance with the present disclosure. As shown in FIG. 4, a UE 405 may communicate with a base station 410 and a base station 415. The base station 410 may be associated with a first cell and the base station 415 may be associated with a second cell. For example, in some aspects, the base station 410 may provide a first cell and the base station 415 may provide a second cell. The first cell may be a secondary cell and the second cell may be a primary cell.

As shown by reference number 420, the base station 410 may transmit, to the UE 405, a TAG configuration. In some aspects, the TAG configuration may be carried in a radio resource control (RRC) message. The TAG configuration may indicate that a TAG includes a first subset of SSBs of a first set of SSBs associated with the base station 410 and a second subset of SSBs of a second set of SSBs associated with a second base station 415. In some aspects, the TAG configuration may indicate that the second subset of SSBs is to be included in the TAG based at least in part on a determination that a timing advance (TA) from the primary cell provided by the base station 410 satisfies a TA threshold.

As shown by reference number 425, the base station 410 may transmit, and the UE 405 may receive, an indication of the TA threshold. In some aspects, the indication of the TA threshold may be carried in a downlink MAC CE or a DCI transmission. In some aspects, the TA threshold may be based at least in part on a subcarrier spacing (SCS) satisfying an SCS criterion. For example, in some aspects, the base station 410 may determine that the SCS satisfies the SCS criterion and may establish the TA threshold based at least in part on determining that the SCS satisfies the SCS criterion.

As shown by reference number 430, the base station 415 may transmit, to the UE 405, an SSB. In some aspects, the base station 415 may transmit and/or the UE 405 may receive and decode, the SSB based at least in part on a determination that the SSB is included in the TAG that includes the first subset of SSBs of the first set of SSBs associated with the base station 410 and the second subset of SSBs of the second set of SSBs associated with the base station 415.

In some aspects, the first subset of SSBs and the second subset of SSBs are included in the TAG based at least in part on a determination that the TA from the primary cell satisfies the TA threshold. As shown by reference number 435, the UE 405 may determine that the TA from the primary cell satisfies the TA threshold. As shown by reference number 440, the UE 405 may communicate with the base station 415 based at least in part on the SSB.

As indicated above, FIG. 4 is provided as an example. Other examples may differ from what is described with respect to FIG. 4.

Figure 5:
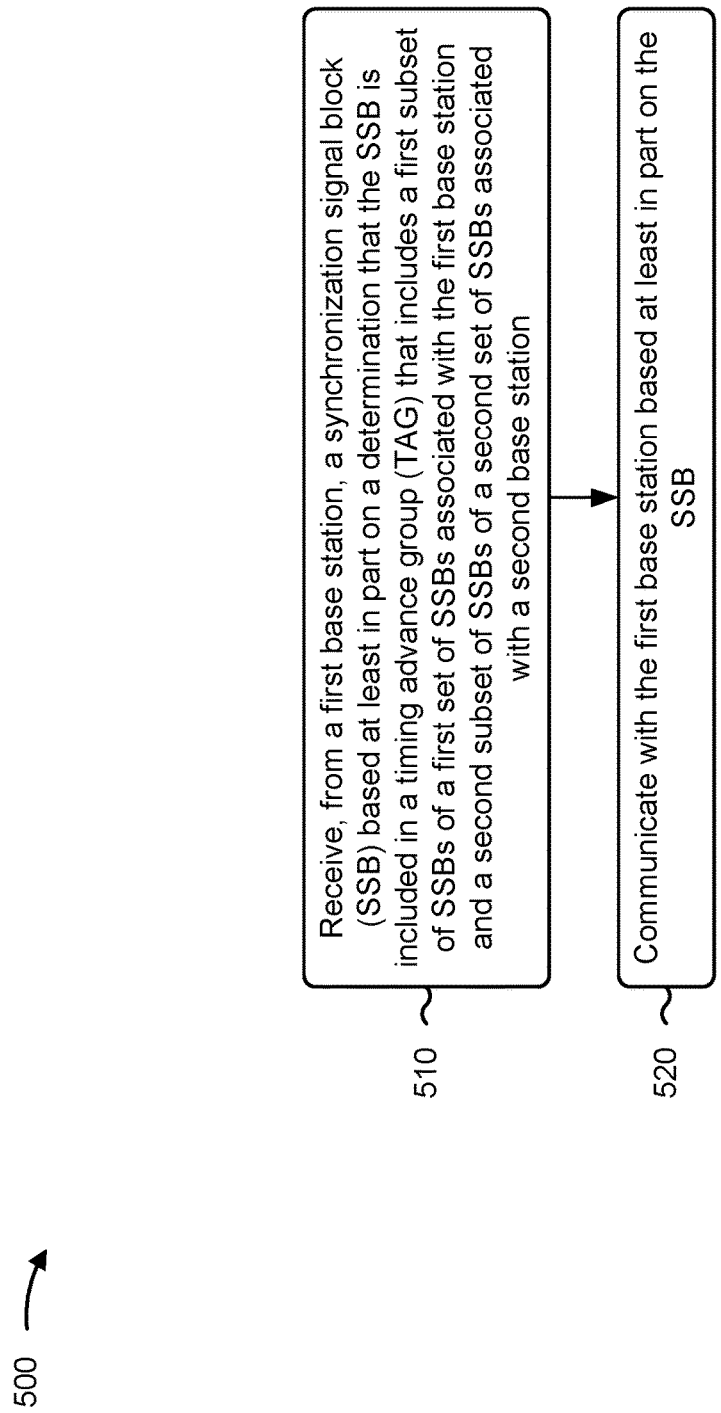
FIGS. 5-7 are diagrams illustrating example processes associated with grouping of SSB subsets from different base stations in a single TAG, in accordance with the present disclosure.

FIG. 5 is a diagram illustrating an example process 500 performed, for example, by a UE, in accordance with the present disclosure. Example process 500 is an example where the UE (e.g., UE 405) performs operations associated with grouping of SSB subsets from different base stations in a single TAG.

As shown in FIG. 5, in some aspects, process 500 may include receiving, from a first base station, an SSB based at least in part on a determination that the SSB is included in a TAG that includes a first subset of SSBs of a first set of SSBs associated with the first base station and a second subset of SSBs of a second set of SSBs associated with a second base station (block 510). For example, the UE (e.g., using reception component 802, depicted in FIG. 8) may receive, from a first base station, an SSB based at least in part on a determination that the SSB is included in a TAG that includes a first subset of SSBs of a first set of SSBs associated with the first base station and a second subset of SSBs of a second set of SSBs associated with a second base station, as described above.

As further shown in FIG. 5, in some aspects, process 500 may include communicating with the first base station based at least in part on the SSB (block 520). For example, the UE (e.g., using reception component 802 and/or transmission component 804, depicted in FIG. 8) may communicate with the first base station based at least in part on the SSB, as described above.

Process 500 may include additional aspects, such as any single aspect or any combination of aspects described below and/or in connection with one or more other processes described elsewhere herein.

In a first aspect, the second base station provides a primary cell.

In a second aspect, alone or in combination with the first aspect, the first subset of SSBs and the second subset of SSBs are included in the TAG based at least in part on a determination that a TA from the primary cell satisfies a TA threshold.

In a third aspect, alone or in combination with one or more of the first and second aspects, the TA threshold is based at least in part on an SCS satisfying an SCS criterion.

In a fourth aspect, alone or in combination with one or more of the first through third aspects, process 500 includes receiving an indication of the TA threshold.

In a fifth aspect, alone or in combination with one or more of the first through fourth aspects, the indication of the TA threshold is carried in a downlink MAC CE or a DCI transmission.

In a sixth aspect, alone or in combination with one or more of the first through fifth aspects, the first base station provides a secondary cell.

In a seventh aspect, alone or in combination with one or more of the first through sixth aspects, process 500 includes receiving, from the second base station, a TAG configuration that indicates a conditional relationship between the first subset of SSBs and the TAG.

In an eighth aspect, alone or in combination with one or more of the first through seventh aspects, the TAG configuration is carried in an RRC message.

Although FIG. 5 shows example blocks of process 500, in some aspects, process 500 may include additional blocks, fewer blocks, different blocks, or differently arranged blocks than those depicted in FIG. 5. Additionally, or alternatively, two or more of the blocks of process 500 may be performed in parallel.

Figure 6:
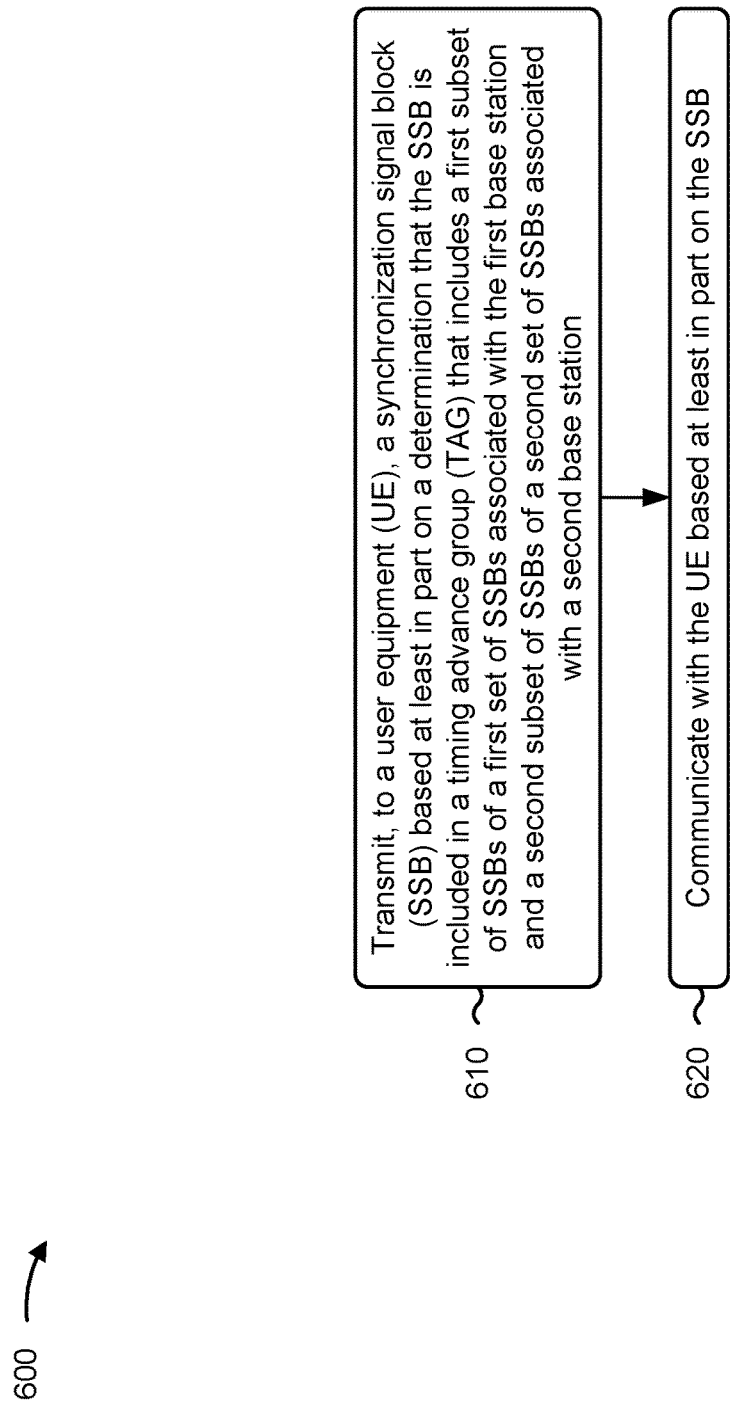

FIG. 6 is a diagram illustrating an example process 600 performed, for example, by a first base station, in accordance with the present disclosure. Example process 600 is an example where the first base station (e.g., first base station 110) performs operations associated with grouping of SSB subsets from different base stations in a single TAG.

As shown in FIG. 6, in some aspects, process 600 may include transmitting, to a UE, an SSB based at least in part on a determination that the SSB is included in a TAG that includes a first subset of SSBs of a first set of SSBs associated with the first base station and a second subset of SSBs of a second set of SSBs associated with a second base station (block 610). For example, the first base station (e.g., using transmission component 904, depicted in FIG. 9) may transmit, to a UE, an SSB based at least in part on a determination that the SSB is included in a TAG that includes a first subset of SSBs of a first set of SSBs associated with the first base station and a second subset of SSBs of a second set of SSBs associated with a second base station, as described above.

As further shown in FIG. 6, in some aspects, process 600 may include communicating with the UE based at least in part on the SSB (block 620). For example, the first base station (e.g., using reception component 902 and/or transmission component 904, depicted in FIG. 9) may communicate with the UE based at least in part on the SSB, as described above.

Process 600 may include additional aspects, such as any single aspect or any combination of aspects described below and/or in connection with one or more other processes described elsewhere herein.

In a first aspect, the second base station provides a primary cell.

In a second aspect, alone or in combination with the first aspect, the first subset of SSBs and the second subset of SSBs are included in the TAG based at least in part on a determination that a TA from the primary cell satisfies a TA threshold.

In a third aspect, alone or in combination with one or more of the first and second aspects, the TA threshold is based at least in part on an SCS satisfying an SCS criterion.

In a fourth aspect, alone or in combination with one or more of the first through third aspects, the first base station provides a secondary cell.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

Figure 7:
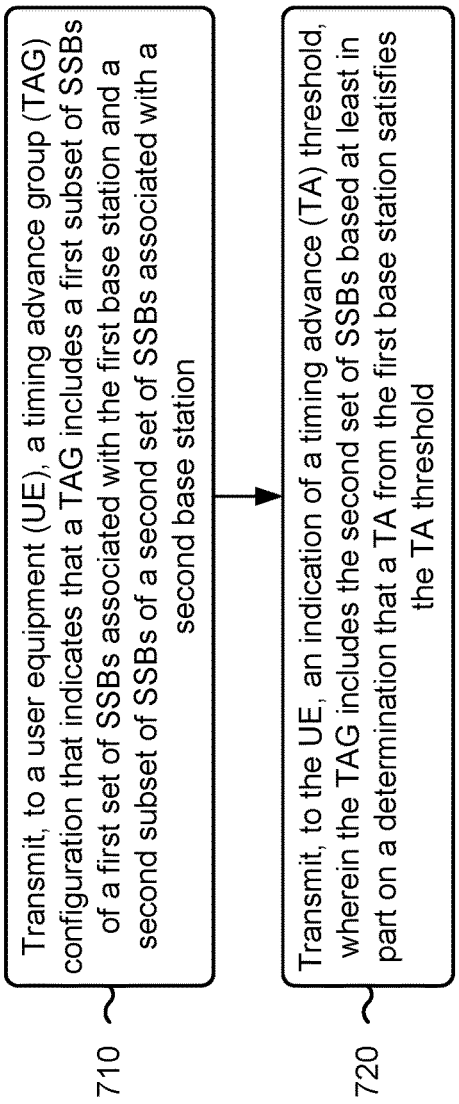

FIG. 7 is a diagram illustrating an example process 700 performed, for example, by a first base station, in accordance with the present disclosure. Example process 700 is an example where the first base station (e.g., first base station 110) performs operations associated with grouping of SSB subsets from different base stations in a single TAG.

As shown in FIG. 7, in some aspects, process 700 may include transmitting, to a UE, a TAG configuration that indicates that a TAG includes a first subset of SSBs of a first set of SSBs associated with the first base station and a second subset of SSBs of a second set of SSBs associated with a second base station (block 710). For example, the first base station (e.g., using transmission component 904, depicted in FIG. 9) may transmit, to a UE, a TAG configuration that indicates that a TAG includes a first subset of SSBs of a first set of SSBs associated with the first base station and a second subset of SSBs of a second set of SSBs associated with a second base station, as described above.

As further shown in FIG. 7, in some aspects, process 700 may include transmitting, to the UE, an indication of a TA threshold, wherein the TAG includes the second set of SSBs based at least in part on a determination that a TA from the first base station satisfies the TA threshold (block 720). For example, the first base station (e.g., using transmission component 904, depicted in FIG. 9) may transmit, to the UE, an indication of a TA threshold, wherein the TAG includes the second set of SSBs based at least in part on a determination that a TA from the first base station satisfies the TA threshold, as described above.

Process 700 may include additional aspects, such as any single aspect or any combination of aspects described below and/or in connection with one or more other processes described elsewhere herein.

In a first aspect, the first base station provides a primary cell.

In a second aspect, alone or in combination with the first aspect, the TA threshold is based at least in part on an SCS satisfying an SCS criterion.

In a third aspect, alone or in combination with one or more of the first and second aspects, the indication of the TA threshold is carried in a downlink MAC CE or a DCI transmission.

In a fourth aspect, alone or in combination with one or more of the first through third aspects, the second base station provides a secondary cell.

In a fifth aspect, alone or in combination with one or more of the first through fourth aspects, the TAG configuration is carried in an RRC message.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
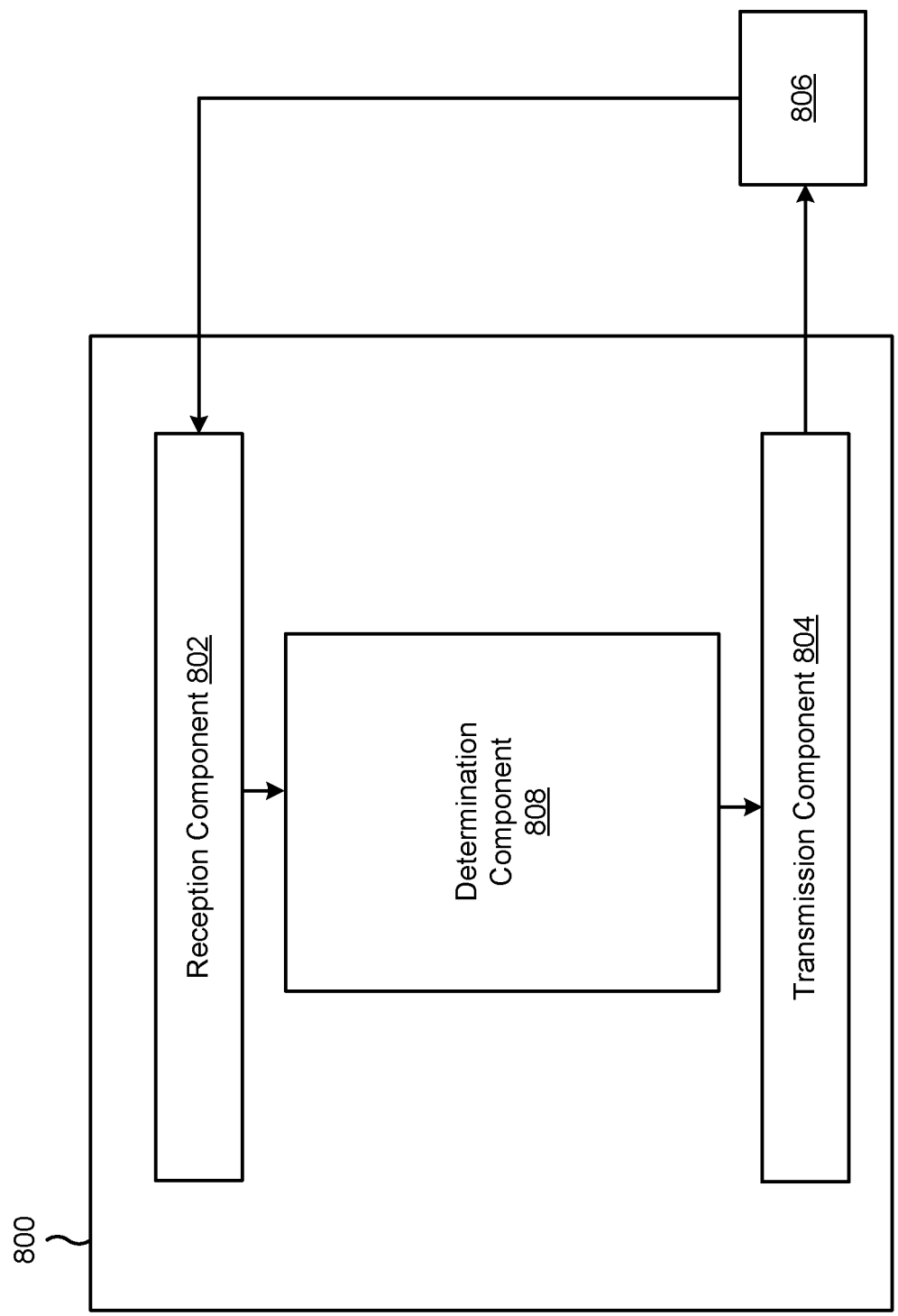
FIGS. 8 and 9 are block diagrams of example apparatuses for wireless communication, in accordance with the present disclosure.

FIG. 8 is a block diagram of an example apparatus 800 for wireless communication. The apparatus 800 may be a UE, or a UE may include the apparatus 800. In some aspects, the apparatus 800 includes a reception component 802 and a transmission component 804, which may be in communication with one another (for example, via one or more buses and/or one or more other components). As shown, the apparatus 800 may communicate with another apparatus 806 (such as a UE, a base station, or another wireless communication device) using the reception component 802 and the transmission component 804. As further shown, the apparatus 800 may include a determination component 808.

In some aspects, the apparatus 800 may be configured to perform one or more operations described herein in connection with FIG. 4. Additionally, or alternatively, the apparatus 800 may be configured to perform one or more processes described herein, such as process 500 of FIG. 5. In some aspects, the apparatus 800 and/or one or more components shown in FIG. 8 may include one or more components of the UE described above in connection with FIG. 2. Additionally, or alternatively, one or more components shown in FIG. 8 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 802 may receive communications, such as reference signals, control information, data communications, or a combination thereof, from the apparatus 806. The reception component 802 may provide received communications to one or more other components of the apparatus 800. In some aspects, the reception component 802 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 806. In some aspects, the reception component 802 may include one or more antennas, a demodulator, a MIMO detector, a receive processor, a controller/processor, a memory, or a combination thereof, of the UE described above in connection with FIG. 2.

The transmission component 804 may transmit communications, such as reference signals, control information, data communications, or a combination thereof, to the apparatus 806. In some aspects, one or more other components of the apparatus 806 may generate communications and may provide the generated communications to the transmission component 804 for transmission to the apparatus 806. In some aspects, the transmission component 804 may perform signal processing on the generated communications (such as filtering, amplification, modulation, digital-to-analog conversion, multiplexing, interleaving, mapping, or encoding, among other examples), and may transmit the processed signals to the apparatus 806. In some aspects, the transmission component 804 may include one or more antennas, a modulator, a transmit MIMO processor, a transmit processor, a controller/processor, a memory, or a combination thereof, of the UE described above in connection with FIG. 2. In some aspects, the transmission component 804 may be co-located with the reception component 802 in a transceiver.

The reception component 802 may receive, from a first base station, an SSB based at least in part on a determination that the SSB is included in a TAG that includes a first subset of SSBs of a first set of SSBs associated with the first base station and a second subset of SSBs of a second set of SSBs associated with a second base station. The reception component 802 and/or the transmission component 804 may communicate with the first base station based at least in part on the SSB.

The reception component 802 may receive an indication of the TA threshold. The reception component 802 may receive, from the second base station, a TAG configuration that indicates a conditional relationship between the first subset of SSBs and the TAG. The determination component 808 may determine that a TA satisfies the TA threshold. In some aspects, the determination component 808 may include one or more antennas, a modulator, a transmit MIMO processor, a transmit processor, a controller/processor, a memory, or a combination thereof, of the UE described above in connection with FIG. 2. In some aspects, the determination component 808 may include the reception component 802 and/or the transmission component 804.

The number and arrangement of components shown in FIG. 8 are provided as an example. In practice, there may be additional components, fewer components, different components, or differently arranged components than those shown in FIG. 8. Furthermore, two or more components shown in FIG. 8 may be implemented within a single component, or a single component shown in FIG. 8 may be implemented as multiple, distributed components. Additionally, or alternatively, a set of (one or more) components shown in FIG. 8 may perform one or more functions described as being performed by another set of components shown in FIG. 8.

Figure 9:
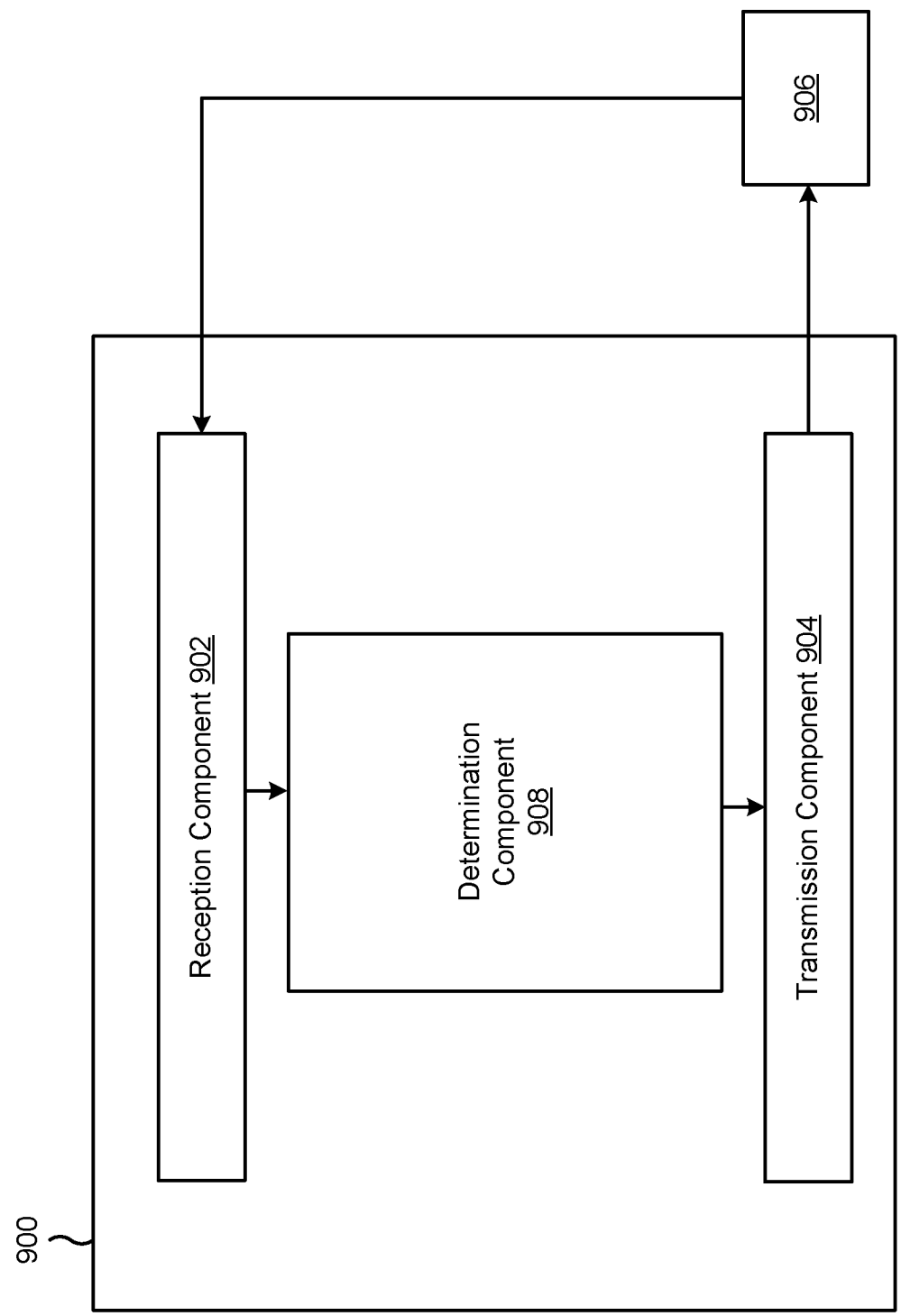

FIG. 9 is a block diagram of an example apparatus 900 for wireless communication. The apparatus 900 may be a base station, or a base station may include the apparatus 900. In some aspects, the apparatus 900 includes a reception component 902 and a transmission component 904, which may be in communication with one another (for example, via one or more buses and/or one or more other components). As shown, the apparatus 900 may communicate with another apparatus 906 (such as a UE, a base station, or another wireless communication device) using the reception component 902 and the transmission component 904. As further shown, the apparatus 900 may include a determination component 908.

In some aspects, the apparatus 900 may be configured to perform one or more operations described herein in connection with FIG. 4. Additionally, or alternatively, the apparatus 900 may be configured to perform one or more processes described herein, such as process 600 of FIG. 6, process 700 of FIG. 7, or a combination thereof. In some aspects, the apparatus 900 and/or one or more components shown in FIG. 9 may include one or more components of the base station described above in connection with FIG. 2. Additionally, or alternatively, one or more components shown in FIG. 9 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 902 may receive communications, such as reference signals, control information, data communications, or a combination thereof, from the apparatus 906. The reception component 902 may provide received communications to one or more other components of the apparatus 900. In some aspects, the reception component 902 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 906. In some aspects, the reception component 902 may include one or more antennas, a demodulator, a MIMO detector, a receive processor, a controller/processor, a memory, or a combination thereof, of the base station described above in connection with FIG. 2.

The transmission component 904 may transmit communications, such as reference signals, control information, data communications, or a combination thereof, to the apparatus 906. In some aspects, one or more other components of the apparatus 906 may generate communications and may provide the generated communications to the transmission component 904 for transmission to the apparatus 906. In some aspects, the transmission component 904 may perform signal processing on the generated communications (such as filtering, amplification, modulation, digital-to-analog conversion, multiplexing, interleaving, mapping, or encoding, among other examples), and may transmit the processed signals to the apparatus 906. In some aspects, the transmission component 904 may include one or more antennas, a modulator, a transmit MIMO processor, a transmit processor, a controller/processor, a memory, or a combination thereof, of the base station described above in connection with FIG. 2. In some aspects, the transmission component 904 may be co-located with the reception component 902 in a transceiver.

The transmission component 904 may transmit, to a UE, an SSB based at least in part on a determination that the SSB is included in a TAG that includes a first subset of SSBs of a first set of SSBs associated with the first base station and a second subset of SSBs of a second set of SSBs associated with a second base station. The reception component 902 and/or transmission component 904 may communicate with the UE based at least in part on the SSB.

The transmission component 904 may transmit, to a UE, a TAG configuration that indicates that a TAG includes a first subset of SSBs of a first set of SSBs associated with the first base station and a second subset of SSBs of a second set of SSBs associated with a second base station. The transmission component 904 may transmit, to the UE, an indication of a TA threshold, wherein the TAG includes the second set of SSBs based at least in part on a determination that a TA from the first base station satisfies the TA threshold.

The determination component 908 may determine a TAG configuration, an SSB configuration, a TA, a UE location, and/or a resource allocation, among other examples. In some aspects, the determination component 908 may include one or more antennas, a demodulator, a MIMO detector, a receive processor, a controller/processor, a memory, or a combination thereof, of the base station described above in connection with FIG. 2. In some aspects, the determination component 908 may include the reception component 902 and/or the transmission component 904.

The number and arrangement of components shown in FIG. 9 are provided as an example. In practice, there may be additional components, fewer components, different components, or differently arranged components than those shown in FIG. 9. Furthermore, two or more components shown in FIG. 9 may be implemented within a single component, or a single component shown in FIG. 9 may be implemented as multiple, distributed components. Additionally, or alternatively, a set of (one or more) components shown in FIG. 9 may perform one or more functions described as being performed by another set of components shown in FIG. 9.

The following provides an overview of some Aspects of the present disclosure:

Aspect 1: A method of wireless communication performed by a user equipment (UE), comprising: receiving, from a first base station, a synchronization signal block (SSB) based at least in part on a determination that the SSB is included in a timing advance group (TAG) that includes a first subset of SSBs of a first set of SSBs associated with the first base station and a second subset of SSBs of a second set of SSBs associated with a second base station; and communicating with the first base station based at least in part on the SSB.

Aspect 2: The method of Aspect 1, wherein the second base station provides a primary cell.

Aspect 3: The method of Aspect 2, wherein the first subset of SSBs and the second subset of SSBs are included in the TAG based at least in part on a determination that a timing advance (TA) from the primary cell satisfies a TA threshold.

Aspect 4: The method of Aspect 3, wherein the TA threshold is based at least in part on a subcarrier spacing satisfying a subcarrier spacing criterion.

Aspect 5: The method of either of Aspects 3 or 4, further comprising receiving an indication of the TA threshold.

Aspect 6: The method of Aspect 5, wherein the indication of the TA threshold is carried in a downlink medium access control control element or a downlink control information transmission.

Aspect 7: The method of any of Aspects 1-6, wherein the first base station provides a secondary cell.

Aspect 8: The method of any of Aspects 1-7, further comprising receiving, from the second base station, a TAG configuration that indicates a conditional relationship between the first subset of SSBs and the TAG.

Aspect 9: The method of Aspect 8, wherein the TAG configuration is carried in a radio resource control message.

Aspect 10: A method of wireless communication performed by a first base station, comprising: transmitting, to a user equipment (UE), a synchronization signal block (SSB) based at least in part on a determination that the SSB is included in a timing advance group (TAG) that includes a first subset of SSBs of a first set of SSBs associated with the first base station and a second subset of SSBs of a second set of SSBs associated with a second base station; and communicating with the UE based at least in part on the SSB.

Aspect 11: The method of Aspect 10, wherein the second base station provides a primary cell.

Aspect 12: The method of Aspect 11, wherein the first subset of SSBs and the second subset of SSBs are included in the TAG based at least in part on a determination that a timing advance (TA) from the primary cell satisfies a TA threshold.

Aspect 13: The method of Aspect 12, wherein the TA threshold is based at least in part on a subcarrier spacing satisfying a subcarrier spacing criterion.

Aspect 14: The method of any of Aspects 10-13, wherein the first base station provides a secondary cell.

Aspect 15: A method of wireless communication performed by a first base station, comprising: transmitting, to a user equipment (UE), a timing advance group (TAG) configuration that indicates that a TAG includes a first subset of SSBs of a first set of SSBs associated with the first base station and a second subset of SSBs of a second set of SSBs associated with a second base station; and transmitting, to the UE, an indication of a timing advance (TA) threshold, wherein the TAG includes the second set of SSBs based at least in part on a determination that a TA from the first base station satisfies the TA threshold.

Aspect 16: The method of Aspect 15, wherein the first base station provides a primary cell.

Aspect 17: The method of either of Aspects 15 or 16, wherein the TA threshold is based at least in part on a subcarrier spacing satisfying a subcarrier spacing criterion.

Aspect 18: The method of any of Aspects 15-17, wherein the indication of the TA threshold is carried in a downlink medium access control control element or a downlink control information transmission.

Aspect 19: The method of any of Aspects 15-18, wherein the second base station provides a secondary cell.

Aspect 20: The method of any of Aspects 15-19, wherein the TAG configuration is carried in a radio resource control message.

Aspect 21: An apparatus for wireless communication at a device, comprising a processor; memory coupled with the processor; and instructions stored in the memory and executable by the processor to cause the apparatus to perform the method of one or more Aspects of Aspects 1-9.

Aspect 22: A device for wireless communication, comprising a memory and one or more processors coupled to the memory, the memory and the one or more processors configured to perform the method of one or more Aspects of Aspects 1-9.

Aspect 23: An apparatus for wireless communication, comprising at least one means for performing the method of one or more Aspects of Aspects 1-9.

Aspect 24: A non-transitory computer-readable medium storing code for wireless communication, the code comprising instructions executable by a processor to perform the method of one or more Aspects of Aspects 1-9.

Aspect 25: A non-transitory computer-readable medium storing a set of instructions for wireless communication, the set of instructions comprising one or more instructions that, when executed by one or more processors of a device, cause the device to perform the method of one or more Aspects of Aspects 1-9.

Aspect 26: An apparatus for wireless communication at a device, comprising a processor; memory coupled with the processor; and instructions stored in the memory and executable by the processor to cause the apparatus to perform the method of one or more Aspects of Aspects 10-14.

Aspect 27: A device for wireless communication, comprising a memory and one or more processors coupled to the memory, the memory and the one or more processors configured to perform the method of one or more Aspects of Aspects 10-14.

Aspect 28: An apparatus for wireless communication, comprising at least one means for performing the method of one or more Aspects of Aspects 10-14.

Aspect 29: A non-transitory computer-readable medium storing code for wireless communication, the code comprising instructions executable by a processor to perform the method of one or more Aspects of Aspects 10-14.

Aspect 30: A non-transitory computer-readable medium storing a set of instructions for wireless communication, the set of instructions comprising one or more instructions that, when executed by one or more processors of a device, cause the device to perform the method of one or more Aspects of Aspects 10-14.

Aspect 31: An apparatus for wireless communication at a device, comprising a processor; memory coupled with the processor; and instructions stored in the memory and executable by the processor to cause the apparatus to perform the method of one or more Aspects of Aspects 15-20.

Aspect 32: A device for wireless communication, comprising a memory and one or more processors coupled to the memory, the memory and the one or more processors configured to perform the method of one or more Aspects of Aspects 15-20.

Aspect 33: An apparatus for wireless communication, comprising at least one means for performing the method of one or more Aspects of Aspects 15-20.

Aspect 34: A non-transitory computer-readable medium storing code for wireless communication, the code comprising instructions executable by a processor to perform the method of one or more Aspects of Aspects 15-20.

Aspect 35: A non-transitory computer-readable medium storing a set of instructions for wireless communication, the set of instructions comprising one or more instructions that, when executed by one or more processors of a device, cause the device to perform the method of one or more Aspects of Aspects 15-20.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A user equipment (UE) for wireless communication, comprising:
a memory; and
one or more processors, coupled to the memory, configured to:
receive, from a first network entity, a synchronization signal block (SSB) based at least in part on a determination that the SSB is included in a timing advance group (TAG) that includes a first subset of SSBs of a first set of SSBs associated with the first network entity and a second subset of SSBs of a second set of SSBs associated with a second network entity, wherein the first subset of SSBs and the second subset of SSBs are included in the TAG based at least in part on a determination that a timing advance (TA) from a primary cell satisfies a TA threshold; and
communicate with the first network entity based at least in part on the SSB.

2. The UE of claim 1, wherein the second network entity provides the primary cell.

3. The UE of claim 1, wherein the TA threshold is based at least in part on a subcarrier spacing satisfying a subcarrier spacing criterion.

4. The UE of claim 1, wherein the one or more processors are further configured to receive an indication of the TA threshold.

5. The UE of claim 4, wherein the indication of the TA threshold is carried in a downlink medium access control control element or a downlink control information transmission.

6. The UE of claim 1, wherein the first network entity provides a secondary cell.

7. The UE of claim 6, wherein the UE is configured to be dually connected with the primary cell and the secondary cell.

8. The UE of claim 1, wherein the one or more processors are further configured to receive, from the second network entity, a TAG configuration that indicates a conditional relationship between the first subset of SSBs and the TAG.

9. The UE of claim 8, wherein the TAG configuration is carried in a radio resource control message.

10. A first network entity for wireless communication, comprising:
a memory; and
one or more processors, coupled to the memory, configured to:
transmit, to a user equipment (UE), a synchronization signal block (SSB) based at least in part on a determination that the SSB is included in a timing advance group (TAG) that includes a first subset of SSBs of a first set of SSBs associated with the first network entity and a second subset of SSBs of a second set of SSBs associated with a second network entity, wherein the first subset of SSBs and the second subset of SSBs are included in the TAG based at least in part on a determination that a timing advance (TA) from a primary cell satisfies a TA threshold; and
communicate with the UE based at least in part on the SSB.

11. The first network entity of claim 10, wherein the second network entity provides the primary cell.

12. The first network entity of claim 10, wherein the TA threshold is based at least in part on a subcarrier spacing satisfying a subcarrier spacing criterion.

13. The first network entity of claim 10, wherein the first network entity provides a secondary cell.

14. The first network entity of claim 10, wherein the one or more processors are further configured to transmit an indication of the TA threshold.

15. A method of wireless communication performed by a user equipment (UE), comprising:
receiving, from a first network entity, a synchronization signal block (SSB) based at least in part on a determination that the SSB is included in a timing advance group (TAG) that includes a first subset of SSBs of a first set of SSBs associated with the first network entity and a second subset of SSBs of a second set of SSBs associated with a second network entity, wherein the first subset of SSBs and the second subset of SSBs are included in the TAG based at least in part on a determination that a timing advance (TA) from the primary cell satisfies a TA threshold; and
communicating with the first network entity based at least in part on the SSB.

16. The method of claim 15, wherein the second network entity provides the primary cell.

17. The method of claim 15, wherein the TA threshold is based at least in part on a subcarrier spacing satisfying a subcarrier spacing criterion.

18. The method of claim 15, further comprising receiving an indication of the TA threshold.

19. The method of claim 18, wherein the indication of the TA threshold is carried in a downlink medium access control control element or a downlink control information transmission.

20. The method of claim 15, wherein the first network entity provides a secondary cell.

21. The method of claim 20, wherein the UE is configured to be dually connected with the primary cell and the secondary cell.

22. The method of claim 15, further comprising receiving, from the second network entity, a TAG configuration that indicates a conditional relationship between the first subset of SSBs and the TAG.

23. The method of claim 22, wherein the TAG configuration is carried in a radio resource control message.

24. A non-transitory computer-readable medium storing a set of instructions for wireless communication includes one or more instructions that, when executed by one or more processors of a user equipment (UE), cause the UE to:
receive, from a first network entity, a synchronization signal block (SSB) based at least in part on a determination that the SSB is included in a timing advance group (TAG) that includes a first subset of SSBs of a first set of SSBs associated with the first network entity and a second subset of SSBs of a second set of SSBs associated with a second network entity, the first subset of SSBs and the second subset of SSBs being included in the TAG based at least in part on a determination that a timing advance (TA) from a primary cell satisfies a TA threshold; and
communicate with the first network entity based at least in part on the SSB.

25. The non-transitory computer-readable medium of claim 24, wherein the second network entity provides the primary cell.

26. The non-transitory computer-readable medium of claim 24, wherein the TA threshold is based at least in part on a subcarrier spacing satisfying a subcarrier spacing criterion.

27. The non-transitory computer-readable medium of claim 24, wherein the one or more processors are further configured to receive an indication of the TA threshold.

28. The non-transitory computer-readable medium of claim 27, wherein the indication of the TA threshold is carried in a downlink medium access control control element or a downlink control information transmission.

29. The non-transitory computer-readable medium of claim 24, wherein the UE is configured to be dually connected with the primary cell associated with the second network entity and a secondary cell associated with the first network entity.

* * * * *